(12) United States Patent
Chavda et al.

(10) Patent No.: US 8,214,327 B2
(45) Date of Patent: Jul. 3, 2012

(54) OPTIMIZATION AND STAGING METHOD AND SYSTEM

(75) Inventors: Kavita Chavda, Roswell, GA (US); Mickey Iqbal, Tucker, GA (US); Seshashayee Sankarshana Murthy, Somers, NY (US); Sandeep Madhav Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/501,604

(22) Filed: Jul. 13, 2009

(65) Prior Publication Data

US 2011/0010343 A1    Jan. 13, 2011

(51) Int. Cl.
G06F 17/30 (2006.01)
(52) U.S. Cl. .................................... 707/609; 707/812
(58) Field of Classification Search .................. 707/609, 707/812
See application file for complete search history.

(56) References Cited

U.S. PATENT DOCUMENTS

| | | | |
|---|---|---|---|
| 2006/0129771 | A1 | 6/2006 | Dasgupta et al. |
| 2007/0011669 | A1 | 1/2007 | Varma et al. |
| 2007/0061461 | A1 | 3/2007 | Hicks et al. |
| 2007/0162321 | A1 | 7/2007 | Behrmann et al. |
| 2008/0059387 | A1 | 3/2008 | Vaidhyanathan et al. |
| 2008/0077366 | A1 | 3/2008 | Neuse et al. |
| 2008/0222644 | A1 | 9/2008 | Richards et al. |
| 2008/0270515 | A1 | 10/2008 | Chen et al. |

Primary Examiner — Hosain T Alam
Assistant Examiner — Johnese Johnson
(74) Attorney, Agent, or Firm — Schmeiser, Olsen & Watts; Anna Linne

(57) ABSTRACT

An optimization method and system. The method includes receiving by a computing system a data footprint associated with data and a human resource model. The data footprint comprises a primary data section, a secondary data section, and an archive data section. A plurality of data storage strategies are associated with the primary data section, said secondary data section, and said archive data section. The plurality of data storage strategies are compared to each other. A data staging orchestrator software module is executed. The computing system determines based on results of executing the data staging orchestrator software module, an optimal migration time, an optimal migration speed, and an optimal migration cost for managing storage for portions of the data. The computing system executes a risk modulation software module and determines a risk associated with the managing.

20 Claims, 3 Drawing Sheets

OPTIMIZATION AND STAGING METHOD AND SYSTEM

FIELD OF THE INVENTION

The present invention relates to a method and associated system for optimizing the outsourcing of data and computing resources as well as staging a transition of applications using the computing resources.

BACKGROUND OF THE INVENTION

Determining a location for saving information typically comprises a complicated and inefficient process with little flexibility. Systems are typically required to save information locally which may be costly. Saving information locally may cause data loss due to a malfunction of the system.

SUMMARY OF THE INVENTION

The present invention provides an optimization method comprising:

receiving, by a computing system, a data footprint associated with data, wherein said data footprint comprises a primary data section, a secondary data section, and an archive data section, wherein said computing system comprises a human resource model comprising administrative and operational costs associated with a process for maintaining said data, and wherein said maintaining said data is performed by an entity;

associating, by said computing system, a plurality of data storage strategies with said primary data section, said secondary data section, and said archive data section;

comparing, by said computing system, each data storage strategy of said plurality of data storage strategies to each other data storage strategy of said plurality of data storage strategies;

executing, by a computer processor of said computing system, a data staging orchestrator software module with respect to said human resource model, said primary data section, said secondary data section, said archive data section, and results of said comparing each said data storage strategy to each said other data storage strategy;

determining, by said computing system based on results of said executing said data staging orchestrator software module, an optimal migration time, an optimal migration speed, and an optimal migration cost for managing storage for portions of said data and associated portions of said administrative and operational costs;

executing, by said computing system, a risk modulation software module with respect to said optimal migration time, said optimal migration speed, and said optimal migration cost for said managing;

determining, by said computing system based on results of said executing said modulation software module, a risk associated with said managing;

generating, by said computing system, a report indicating said an optimal migration time, said optimal migration speed, and said optimal migration cost for said managing and said risk; and transmitting, by said computing system to a user, said report.

The present invention provides a computing system comprising a processor coupled to a computer-readable memory unit, said memory unit comprising instructions that when executed by the processor implements an optimization method, said method comprising:

receiving, by said computing system, a data footprint associated with data, wherein said data footprint comprises a primary data section, a secondary data section, and an archive data section, wherein said computing system comprises a human resource model comprising administrative and operational costs associated with a process for maintaining said data, and wherein said maintaining said data is performed by an entity;

associating, by said computing system, a plurality of data storage strategies with said primary data section, said secondary data section, and said archive data section;

comparing, by said computing system, each data storage strategy of said plurality of data storage strategies to each other data storage strategy of said plurality of data storage strategies;

executing, by a computer processor of said computing system, a data staging orchestrator software module with respect to said human resource model, said primary data section, said secondary data section, said archive data section, and results of said comparing each said data storage strategy to each said other data storage strategy;

determining, by said computing system based on results of said executing said data staging orchestrator software module, an optimal migration time, an optimal migration speed, and an optimal migration cost for managing storage for portions of said data and associated portions of said administrative and operational costs;

executing, by said computing system, a risk modulation software module with respect to said optimal migration time, said optimal migration speed, and said optimal migration cost for said managing;

determining, by said computing system based on results of said executing said modulation software module, a risk associated with said managing;

generating, by said computing system, a report indicating said an optimal migration time, said optimal migration speed, and said optimal migration cost for said managing and said risk; and transmitting, by said computing system to a user, said report.

The present invention provides a computer program product, comprising a computer readable medium comprising a computer readable program code embodied therein, said computer readable program code adapted to implement an optimization method within a computing system comprising a computer-readable memory unit, said method comprising:

receiving, by said computing system, a data footprint associated with data, wherein said data footprint comprises a primary data section, a secondary data section, and an archive data section, wherein said computing system comprises a human resource model comprising administrative and operational costs associated with a process for maintaining said data, and wherein said maintaining said data is performed by an entity;

associating, by said computing system, a plurality of data storage strategies with said primary data section, said secondary data section, and said archive data section;

comparing, by said computing system, each data storage strategy of said plurality of data storage strategies to each other data storage strategy of said plurality of data storage strategies;

executing, by a computer processor of said computing system, a data staging orchestrator software module with respect to said human resource model, said primary data section, said secondary data section, said archive data section, and results of said comparing each said data storage strategy to each said other data storage strategy;

determining, by said computing system based on results of said executing said data staging orchestrator software module, an optimal migration time, an optimal migration speed, and an optimal migration cost for managing storage for portions of said data and associated portions of said administrative and operational costs;

executing, by said computing system, a risk modulation software module with respect to said optimal migration time, said optimal migration speed, and said optimal migration cost for said managing;

determining, by said computing system based on results of said executing said modulation software module, a risk associated with said managing;

generating, by said computing system, a report indicating said an optimal migration time, said optimal migration speed, and said optimal migration cost for said managing and said risk; and transmitting, by said computing system to a user, said report.

The present invention advantageously provides a method and associated system capable of determining a location for saving information.

DETAILED DESCRIPTION OF THE INVENTION

Figure 1:
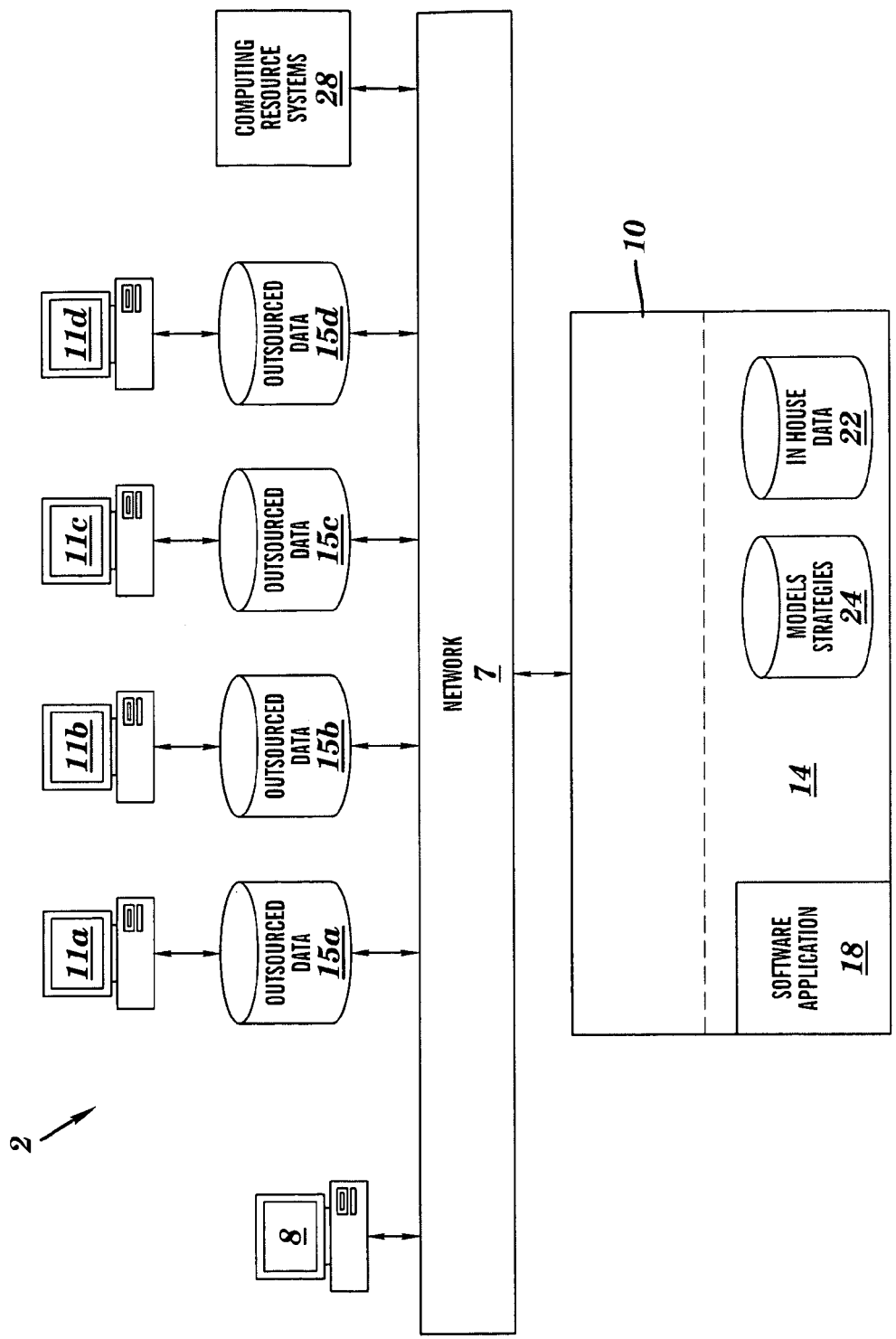
FIG. 1 illustrates a system for optimizing a process for outsourcing data storage and computing resources, in accordance with embodiments of the present invention.

FIG. 1 illustrates a system 2 for optimizing a process for outsourcing data storage and computing resources, in accordance with embodiments of the present invention. System 2 identifies enterprise costs (e.g., associated with running and/or maintaining an enterprise) and associated processes (e.g., performed by an enterprise). Costs may comprise, inter alia, hard costs such as real property, structures placed upon the real property, inventory, equipment, hardware, machines, soft costs such as utilities, insurance, financing, legal, technical support, maintenance, support staff, employee salary, etc. For example, a typical corporation may incur costs for leasing office space, utilities (i.e. electricity, telephone service, heating/air conditioning, waste removal, cleaning, etc.) associated with the office space, hardware rental/leasing (i.e. computers, email servers, application servers, storage solutions (i.e. NAS, SANS, etc.), private branch exchange (PBX) servers, routers/switches, firewalls, printers, facsimile machines, telephones, etc.), hardware maintenance and/or support, insurance, salaries of the corporation's employees, etc. Processes performed by an enterprise may comprise, inter alia, retrieving electronic mail, processing and delivering mail, responding to mail, processing and delivering telephone calls, responding to telephone calls, processing and delivering voicemail messages, responding to said voicemail messages, generating documents, delivering said documents, receiving document requests, processing and responding to said document requests, etc. For example, a conventional enterprise providing software as a service (SaaS) has ten employees and two network administrators. The conventional enterprise maintains one mail server and four application/web servers in a rented office suite. Processes which the conventional enterprise perform may comprise: receiving and responding to electronic mail (email), creating web-based applications, and providing web-based applications to customers via a web interface. In order to optimize a process for outsourcing data storage and computing resources (i.e., optimizing enterprise costs and associated processes), system 2 comprises:

1. An optimization framework that combines decision-making for resource selection across both in-house and outsourced (or managed) data.
2. A staged migration algorithm to filter outsourcing options that are not feasible with respect to impact on foreground processes during data migration to a storage service provider (SSP).
3. A fine-grained strategy classification taxonomy that explores all permutations of outsourcing options.
4. A decision-making framework that accounts for available in-house human resource skills, information technology infrastructure library (ITIL) maturity, and technology constraints. ITIL comprises a set of concepts and techniques for managing information technology (IT) infrastructure, development, and operations.

System 2 of FIG. 1 comprises an I/O devices 8 and 11a . . . 11d, databases 15a . . . 15d (i.e., comprising outsourced data resulting from executing system 2), and computing resource systems 28 connected to a computing system 10 through a network 7. I/O devices 11a . . . 11d are used by an associated user for accessing associated databases 15a . . . 15d. I/O devices 11a . . . 11d and may comprise any type of computing device such as, inter alia, a notebook computer, a desktop computer, a personal digital assistant (PDA), etc. I/O device 8 is used by an associated user for controlling a process for optimizing the outsourcing of data storage and computing resources. I/O device 8 may comprise any type of computing device such as, inter alia, a notebook computer, a desktop computer, a personal digital assistant (PDA), etc. I/O device 8 may be alternatively directly connected to computing system 10. Computing resource systems 28 comprise multiple systems for outsourcing computer resources. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 comprises a memory system 14. Memory system 14 comprises a software application 18, a database 22 (i.e., comprising in-house data for storage), and a database 24 (i.e., comprising data footprints, human resource models, outsourcing strategies, etc). Software application 18 may comprise a data staging orchestrator module, a risk modulation software module, an optimization phase software module, etc). Software application 18 comprises the following components associated with optimizing a process for outsourcing data storage and computing resources:

1. An administrative and operational costs (i.e., a human resource model) module.
2. An optimizer for cloud outsourcing.
3. A data staging orchestrator.
4. A risk modulation module.

Human Resource Model

A human resource model comprises the following parameters:

1. Skill level: The skill level is categorized into high, medium, and low.

2. Expertise: Expertise is based on task groups supported by an administrator. For example task groups may comprise:
   A. A planning (performance, disaster recovery, security, etc) task group.
   B. A monitoring (performance and system status) and operations (firmware and system installation, provisioning, compliance, etc) task group.
   C. A yearly man-hours task group. For example, a number of man-hours for which an administrator will be available.
   D. An hourly rate task group. For example, a dollar cost associated with an administrator.

Software application 18 retrieves details associated with human administrators. Software application 18 may retrieve details associated with human administrators from daily work logs thereby providing avenues for data-mining on expertise levels for various tasks, average time required to complete a task, etc.

Optimizer for Cloud Outsourcing

A goal of performing an optimization process comprises assigning customer service level objectives (SLO) to available hardware and human resources of a customer and a SSP such that a given objective function is either maximized or minimized. Several objective functions are available for the SSP to use in order to dictate which customer SLOs are accepted. System 5 performs a process for maximizing a cumulative difference of costs for serving SLOs at the SSP and the clients.

The following description details a design intuition and overview of the optimizer for cloud outsourcing. Options for outsourcing may be broken down into fine-grained categories as described below:

1. Data out-Management out: Data out-Management out comprises an outsourcing model where a data center is hosted and managed remotely by a storage service provider.
2. Data in-Management out: In scenarios where the customers may not be comfortable with having their data stored remotely, customers may prefer a model where the data is hosted locally, but management is done by the SSP (e.g., remotely, by having their personnel present at a customer site, etc).
3. Data out-Management in: In this model, a data center is hosted remotely, but management is done in-house.
4. Hybrid management: This model is a variation of the previous two approaches. In this approach storage management tasks are split between a storage service provider and the customer.

The above categories may be further sub-divided based on types of data. The data of an enterprise is divided into the following categories:
A. Active/primary
B. Backup/secondary
C. Archive.

Each of these categories differ in their service level agreement (SLA) requirements and a type of infrastructure required for storing. For example, archive data may be stored in low-cost serial advanced technology attachment (SATA) drives within massive array of inexpensive disks (MAID) controllers. Additionally, con-tent addressable storage (CAS) and write once/read many (WORM) media may be employed for compliance data. Additional categories may include:
A. Business intelligence operations.
B. Global dissemination.

Software application 18 formulates decision making as a constraint optimization problem where the objective function is to:

1. Maximize the summation of a cost difference that a SSP may deliver to all customers.
2. Variables for the allocation decision for all data (e.g., where to store the data) and management tasks (where the management tasks will be performed).
3. Constraints based on input information.

Additionally, software application introduces a look ahead time window and estimates possible clients' requirements using specified growth probability and growth percentage (i.e., to account for all future growth potential). A total cost savings comprises the sum of the cost savings over the entire look ahead window. Run-time pro-visioning is performed by appropriately balancing a benefit (saved penalty cost) and a cost (hardware purchasing and maintenance cost).

Software application 18 assumes that regular data, backup data, and compliance data (i.e., units of data types) need to be placed on different devices and breaks a resource optimization problem into three independent sub-problems. This assumption may be applicable in data centers because of different device types used for each data type.

An allocation of human resources may be described in terms of available man-hours for each administrator and a number of man-hours required for different administrative tasks associated with the SLO. Software application 18 generates independent plans for each management task group (planning, monitoring, security etc.).

A mathematical formulation of an NP-hard constraint optimization problem is described as follows:

A unit of allocation in an optimization formulation is defined as a job. A job may be described in terms of a data type (e.g., regular data, backup data, compliance data, etc) or in terms of administrative tasks such as, inter alia, provisioning, security planning, disaster recovery, etc. For each resource (i.e., hardware devices or human administrators), j represents a cost of satisfying a job i ($f s_{ij}$) and may be calculated using its associated cost function which takes an amount of capacity required as input and outputs an estimated dollar amount to provide a service (e.g., purchasing cost, cost of power, administrators hiring cost). Similarly, using the cost functions associated with the clients' resources, software application 18 may calculate a cost for satisfying the same jobs on the client site ($fc_i$). Additionally, a clients job requests may differ at different time intervals. In order to capture costs for satisfying jobs at time t, $fs_{ij}$ and $fc_i$ are both represented as a function of time $fs_{ij}(t)$ and $fc_j(t)$.

Table 1 below illustrates a formulation of constraint optimization.

TABLE 1

| Objective function | $\max_{D \in D} \Sigma_t \Sigma_i \Sigma_j [D_{ij} [ f c_i (t) - f s_{ij} (t)]]$ |
|---|---|
| Variables | $D_{ij} = 1$ if job i is placed on resource j. Otherwise, $D_{ij} = 0$ |
| Constraints | $\Sigma_i D_{ij} X_i (t) \leq a_j (t)$ j = 1, ..., S, t = 1, ..., T |
|  | $\Sigma_i D_{ij} y_i (t) \leq b_j (t)$ j = 1, ..., S, t = 1, ..., T |
|  | $\Sigma_j D_{ij} \leq 1$ i = 1, ..., N |

In table 1, N and S represent a number of jobs and resources. T represents a look ahead window. $x_i(t)$ and $y_i(t)$ represent capacity and throughput requirements of job i. $a_j(t)$ and $b_j(t)$ represent a capacity and throughput available on resource j. Additionally, D represents a feasible assignment which is determined based on a feasibility matrix generated by the policy manager. This objective function captures a combined potential benefit to both the SSP and the clients. A larger objective value implies a larger potential benefit to all involved parties. Additionally, the constraints guarantee that there are no violations of the resource capacity and bandwidth (throughput) constraints and each job is assigned to no more than one SSP resource. Note that when $\Sigma_i D_{ij}=0$, a best option is to have a client job in house, since the SSP is not equipped to handle that SLO.

Software application executes an algorithm enabling an approximation for NP-hard constraint optimization process. The algorithm executes a randomized "rank-and-place" strategy. The randomized "rank-and-place" strategy picks a job randomly and places it at a location that maximizes a value of the objective function. This procedure is repeated until all jobs have been allocated. The procedure maybe repeated a large number of times and a solution leading to the maximum objective value is returned as an optimal solution. Additionally (i.e., for physical resource allocation and enabling dynamic resource provisioning), software application 18 estimates expected penalty values after each job placement and determines a best provisioning amount leading to minimum provisioning and penalty cost. The approximation algorithm works as follows:

1. Initialize: $\tau=\{1, 2, \ldots, N\}$, D=0.
2. Pick a job from $\tau$ at random.
3. Place the current job (e.g., the $k^{th}$) into the resource maximizing the quantity: $\Sigma_t [f c_k(t) - f s_{kj}(t)] / \Sigma_t [a_j(t) - \Sigma_i D_{ij} x_{ij}(t)$ while maintaining feasibility (e.g., an $1^{th}$ resource). Set $D_{kl}=1$ and if no such placement is feasible or leads to positive cost savings, then leave $D_k=0$.
4. Assume that a capacity requirement of each client follows a normal distribution of $N(m_j(t), v_j(t))$, where $m_j$ and $v_j$ comprise an average capacity and a capacity variance at time t. For resource 1 (i.e., at any time t), a total capacity requirement (represented as $X_I(t)$) is also normally distributed with a mean of $\Sigma_j m_j(t)$ and a variance as $\Sigma_j v_j(t)$. In order to determine a best provisioning amount, a minimum provisioning amount (e.g., zero) (lower bound $L_I(t)$) and a maximum provisioning amount (e.g., the maximum allowed capacity minus the existing capacity of the storage devices) (upper bound, $U_1(t)$) is specified and a binary search is performed as follows:
A. Set the provisioning value $V_1(t)=U_1(t)+L_1(t)/2$
B. The expected cost of value V(t) (sum of the pro-visioning cost and the penalty cost) is estimated by integrating cost values along the distribution of the total capacity.
C. The expected cost of $V_1(t)+\delta$, where $\delta$ is a random small positive number.
4. If Cost $(V_1(t))$>Cost$(V_1(t)+\delta)$, then $V_1(t)$ is set as a new lower bound. Otherwise, $V_1(t)$ is set as a new upper bound. A binary search continues until the upper bound and the lower bound converges or after a fixed number of iterations. The final $V_1(t)$ is the provisioning amount at time t.
5. If $\tau$ does not equal 0 then go to step 2. Otherwise, compute a cost savings for a given D.

This approximation algorithm randomly picks jobs and places them into the system to maximize the total cost savings achieved per unit of remaining excess capacity. This metric appropriately captures a tradeoff between cost savings and excess capacity. Based on this approximation algorithm, software application 18 determines an appropriate allocation of physical and administrator resources.

Data Staging Orchestrator

A decision making procedure comprises three phases:
1. An optimization phase.
2. A planning phase to determine a migration speed and start time.
3. A risk modulation phase to determine risk benefit options.

Software application 18 is used to maximize a user's satisfaction for a given optimization window T, which is equivalent to minimizing a system Utility Loss $UL_{sys}$, defined as follows:

$$UL_{sys} = U_{max} - U_{sys}$$
$$= \sum_{j=1}^{N} U_{max_j} - \sum_{j=1}^{N} U_j$$
$$= \sum_{j=1}^{N} UF_j(D_j, SLO_{jlat}) - \sum_{j=1}^{N} UF_j(Thru_j, Lat_j)$$

In the above equation, $D_j$ represents a demand of workload j and ($Thru_j$, $Lat_j$) is an achieved performance of workload j. $U_{max}$ represents an ideal utility value if all of workload j's requests may meet the SLO goal and $U_{max}$ is the maximum system utility value.

The migration operation is partitioned into three regions: before migration happens, during the migration process, and after migration finishes as illustrated by the following equation: $U L(T) = U L_{Before} + U L_{Ongoing} + U L_{After}$ Migration modules retrieve forecasted workload demands, predicted component performance, and utility values as an input and generates a migration plan accordingly. A forecasting of future workload demands is based on extracting patterns and trends from historical data. A general form of a time-series function is as follows: $y_t + h = g(X_t, \theta) + \mathcal{E}_{t+h}$. $y_t$ is a variable(s) vector to be forecasted, t is a time when the forecast is made, $X_t$ is the predictor variable (i.e., usually including observed and lagged values of $y_t$ until time t), $\theta$ is a vector of parameter of the function g, and $\mathcal{E}_{t+h}$ is a prediction error.

A performance prediction is used to estimate storage component performance for any given workload demands and system settings. Software application 18 uses the following performance metrics:
1. Throughput (Thru).
2. Latency (Lat.).

Software application 18 uses white-box and black-box approaches for making performance predictions. A white-box approach establishes equations using device specific information based on expert knowledge. A black-box approach (e.g., table-based solutions, regression models, etc) requires minimum expert input and device specific information and predicts performance based on past historical information.

A concept of utility is used to evaluate a user's perception of satisfaction. Software application 18 executes a utility function to associate workload performance with a utility value which quantifies the user's degree of satisfaction. The following techniques are used to define a utility function:
1. Provided by administrators technique—Administrators use trial-and-error to try multiple versions of a utility function to get a desired level of service.
2. Defined based on SLOs and priorities as defined by the following equation:

$$UF(Thru, Lat) = \begin{cases} 0 & \text{if } Lat > SLO \\ Pri * \min(Thru, SLO_{thru})/SLO_{thru} & \text{otherwise} \end{cases}$$

3. Defined based on price and SLOs—A dollar amount is associated with a level of service received (e.g., $1000/GB if the latency is less than 10 ms, otherwise $100/GB).

Based on utility functions for each workload, an overall storage system utility value is defined as:

$$U_{sys} = \sum_{j=1}^{N} U_j$$

$$= \sum_{j=1}^{N} UF_j(Thru_j, Lat_j)$$

N is a number of workloads in a system, $U_j$, $UF_j$, $Thru_j$ and $Lat_j$ comprise a utility value, utility function, through-put, and latency for workload j, respectively.

For each solution returned during the optimization phase, a detailed plan is generated (i.e., during the planning phase) detailing when to start migration and a corresponding migration speed. Determining a migration speed comprises the following steps:

1. Estimate system utilization: Sys_Utilization=TotalLoad/ MaximumLoad.
2. Set migration speed as MigSpeed=(1−Sys_ Utilization)*p*MAX _SPEED where p is a number between 0 to 1 and changes according to which spectrum of utilization the system is operating in. The heavier the system is loaded, the smaller the p is. The MAX_SPEED is the maximum migration sending rate allowed by the system and reflects how aggressively the migration can perform.
3. Search an optimal resource allocation plan (i.e., sending rate) for additional workloads with a goal of maximizing system utility. The procedure terminates when no utility benefit may be gained by increasing a sending rate of any workload or all workloads have all their requests satisfied.

Choosing a migration start time (t) comprises considering details of a migration option, a performance and utility information of the system, and the future workload trend.

Risk Modulation Module

Software application 18 modulates a risk of each migration option and returns those with low risk and high benefit. Risk captures a probability that a utility improvement of action invocation will be lost (i.e., in future system states) as a result of volatility in the workload time-series functions (e.g., a demand for $W_1$ was expected to be 10K IOPS after 1 month, but it turns out to be 5K). Additionally, a formulation of risk should take into account a loss in utility as a result of making a wrong decision (e.g., moving data at 11 am in a weekday morning during high system utilization has a higher risk compared to moving it at 9 pm on a weekend during low system utilization). Software application 18 uses a value at risk (VaR) to represent a probability, (with a 95% confidence) that a workload system will not grow in the future as follows:

$$VaR(95\% \text{ confidence}) = -1.65\sigma * \sqrt{T}$$

In the above equation, σ equals a standard deviation of time-series request-rate predictions. A risk value $RF(M_k)$ of migration solution k is calculated as follows: $RF(M_k)=-(1+\alpha_{M_k})*VaR$, where α reflects a risk factor of a migration option and is defined as follows: $\alpha_{M_k}$=bytes_moved$_{M_k}$/ total_bytes_on_source*Sys_Utilization$_{M_k}$, where Sys_Utilization is the system utilization when an action is invoked. A higher system utilization or larger migration data set will lead to a larger $\alpha_{Mk}$ and therefore a larger $RF(M_k)$ value which reflects the fact that the migration operation has higher risk and is less preferred. For a K solution output by the planning phase, the risk modulation phase calculate a risk value $RF(M_k)$ for each of them and scales an overall utility loss in order to balance the benefit ($UL_{Mk}$) and the risk ($RF(M_k)$) of a migration option.

Figure 2:
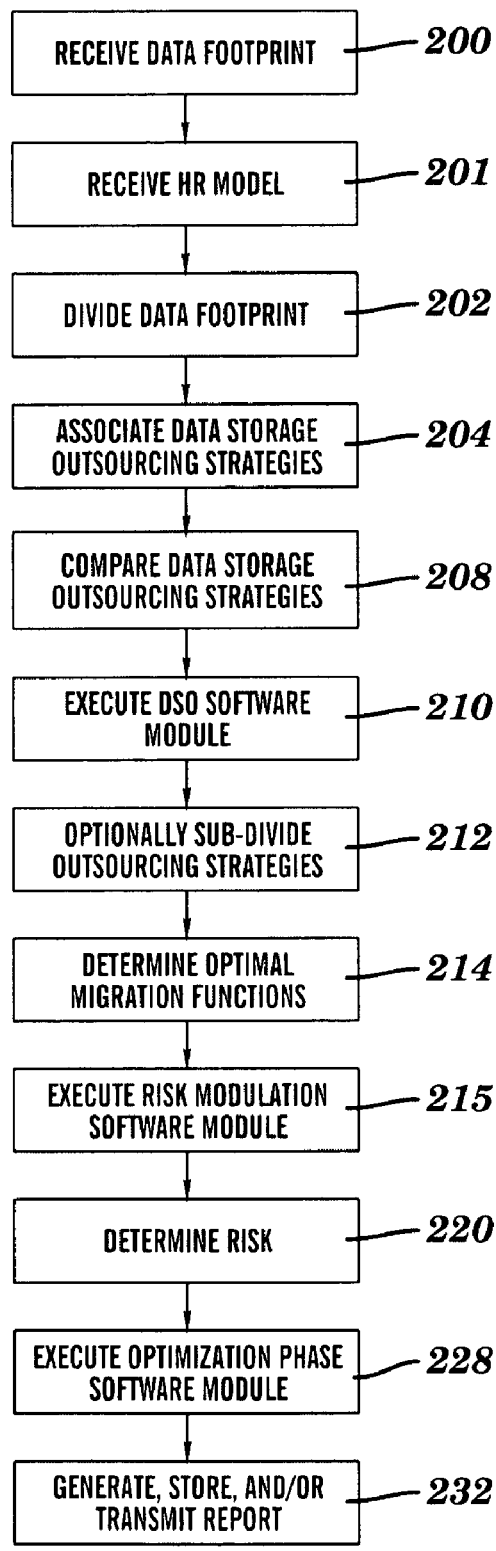
FIG. 2 illustrates a flowchart describing an algorithm used by the system of FIG. 1 for optimizing a process for outsourcing data storage and computing resources, in accordance with embodiments of the present invention.

FIG. 2 illustrates a flowchart describing an algorithm used by system 2 of FIG. 1 for optimizing a process for outsourcing data storage and computing resources, in accordance with embodiments of the present invention. In step 200, a computing system (e.g., computing system 10 in FIG. 1) receives a data footprint associated with data. The data footprint comprises a map or description of the data. In step 201, the computing system receives a human resource model. The human resource model comprises administrative and operational costs associated with a process for maintaining the data, skill levels associated with administrators associated with executing the process for maintaining the data, expertise levels associated with the administrators, yearly man-hours associated with the administrators, hourly rates associated with the administrators, etc. Maintaining the data is performed by an entity. Alternatively, the computing system may already have the human resource model stored within the computing system. In step 202, the computing system divides the data footprint into a primary data section, a secondary data section, and an archive data section. Alternatively, the data footprint may already be divided into the primary data section, the secondary data section, and the archive data section. In step 204, the computing system associates a plurality of data storage outsourcing strategies with the primary data section, the secondary data section, and the archive data section. The plurality of data storage outsourcing strategies may comprise, inter alia, a data outsourcing/management outsourcing strategy, a data in-house/management outsourcing strategy, a data outsourcing/management in-house strategy, a hybrid management strategy, etc. In step 208, the computing system compares each data storage outsourcing strategy to each other. In step 210, the computing system executes a data staging orchestrator software module with respect to the human resource model, the primary data section, the secondary data section, the archive data section, and results of comparing the data storage outsourcing strategies to each other. The data staging orchestrator software module may comprise an optimization phase software module, a planning phase software module, and a risk modulation phase software module. In step 212, the computing system optionally subdivides each data storage outsourcing strategy into an active portion, a backup portion, and an archive portion. In step 214, the computing system determines (i.e., based on results of executing the data staging orchestrator software module) an optimal migration time, an optimal migration speed, and an optimal migration cost for outsourcing storage for portions of data and associated portions of the administrative and operational costs. In step 215, the computing system executes a risk modulation software module with respect to the optimal migration time, the optimal migration speed, and the optimal migration cost for the outsourcing. In step 220, the computing system determines (i.e., based on results of executing the modulation software module) a risk associated with the outsourcing. In step 228, the computing system may perform the following optional steps:

1. Determining (i.e., by the optimization phase software module) specified options associated with solutions for the outsourcing of storage for the portions of the data.
2. Determining (i.e., by the planning phase software module) migration times and migration speeds associated with the specified options.
3. Determining (i.e., by the risk modulation phase software module) a risk-benefit option associated with the migration times, the migration speeds, and the specified options.

In step 232, the computing system generates, stores, and/or transmits a report indicating the optimal migration time, the optimal migration speed, the optimal migration cost for the outsourcing and the risk.

Figure 3:
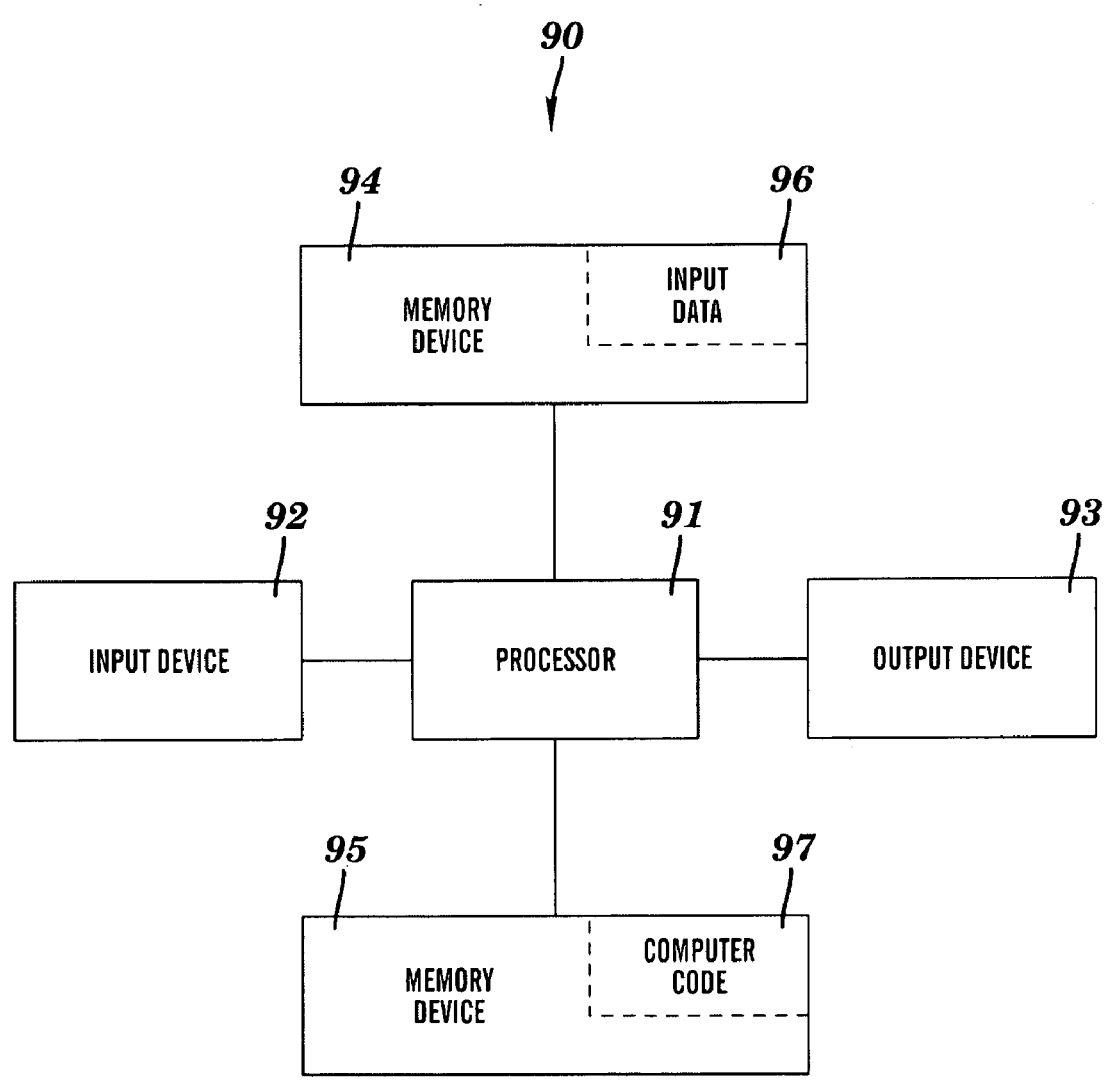
FIG. 3 illustrates a computer apparatus used for optimizing a process for outsourcing data storage and computing resources, in accordance with embodiments of the present invention.

FIG. 3 illustrates a computer apparatus 90 (e.g., computing system 10 of FIG. 1) used for optimizing a process for outsourcing data storage and computing resources, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for optimizing a process for outsourcing data storage and computing resources. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to optimize a process for outsourcing data storage and computing resources. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for optimizing a process for outsourcing data storage and computing resources. In another embodiment, the invention provides a method that performs the process steps of the invention on a subscription, advertising, and/or fee basis. That is, a service provider, such as a Solution Integrator, could offer to optimize a process for outsourcing data storage and computing resources. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An outsourcing optimization method comprising:
receiving, by a computing system, a data footprint associated with data, wherein said data footprint comprises a primary data section, a secondary data section, and an archive data section, wherein said computing system comprises a human resource model comprising administrative and operational costs associated with a process for maintaining said data, and wherein said maintaining said data is performed by an entity;
associating, by said computing system, a plurality of data storage strategies with said primary data section, said secondary data section, and said archive data section;
comparing, by said computing system, each data storage strategy of said plurality of data storage strategies to each other data storage strategy of said plurality of data storage strategies;
executing, by a computer processor of said computing system, a data staging orchestrator software module with respect to said human resource model, said primary data section, said secondary data section, said archive data section, and results of said comparing each said data storage strategy to each said other data storage strategy;
determining, by said computing system based on results of said executing said data staging orchestrator software module, an optimal migration time, an optimal migration speed, and an optimal migration cost for managing storage for portions of said data and associated portions of said administrative and operational costs;
executing, by said computing system, a risk modulation software module with respect to said optimal migration time, said optimal migration speed, and said optimal migration cost for said managing;
determining, by said computing system based on results of said executing said modulation software module, a risk associated with said managing;
generating, by said computing system, a report indicating said an optimal migration time, said optimal migration speed, and said optimal migration cost for said managing and said risk; and
transmitting, by said computing system to a user, said report.

2. The method of claim 1, wherein said human resource model comprises skill levels associated with administrators associated with executing said process for maintaining said data, expertise levels associated with said administrators, yearly man-hours associated with said administrators, and an hourly rate associated with said administrators.

3. The method of claim 1, wherein said plurality of data storage strategies comprise strategies selected from the group consisting of a data management strategy, a data in-house/ management strategy, a data management in-house strategy, and a hybrid management strategy.

4. The method of claim 1, further comprising:
subdividing, by said computing system, each data storage g strategy of said plurality of data storage strategies into an active portion, a backup portion, and an archive portion.

5. The method of claim 1, wherein said data staging orchestrator software module comprises an optimization phase software module, a planning phase software module, and a risk modulation phase software module.

6. The method of claim 5, further comprising:
determining, by said optimization phase software module, specified options associated with solutions for said managing;
determining, by said planning phase software module, migration times and migration speeds associated with said specified options; and
determining, by said risk modulation phase software module, a risk-benefit option associated with said migration times, said migration speeds, and said specified options.

7. The method of claim 6, further comprising:
generating, by said computing system, a report comprising said specified options, said migration times, said migration speeds, and said risk-benefit option.

8. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

9. A computing system comprising a processor coupled to a computer-readable memory unit, said memory unit comprising instructions that when executed by the processor implements an optimization method, said method comprising:
receiving, by said computing system, a data footprint associated with data, wherein said data footprint comprises a primary data section, a secondary data section, and an archive data section, wherein said computing system comprises a human resource model comprising administrative and operational costs associated with a process for maintaining said data, and wherein said maintaining said data is performed by an entity;
associating, by said computing system, a plurality of data storage strategies with said primary data section, said secondary data section, and said archive data section;
comparing, by said computing system, each data storage strategy of said plurality of data storage strategies to each other data storage strategy of said plurality of data storage strategies;
executing, by a computer processor of said computing system, a data staging orchestrator software module with respect to said human resource model, said primary data section, said secondary data section, said archive data section, and results of said comparing each said data storage strategy to each said other data storage strategy;
determining, by said computing system based on results of said executing said data staging orchestrator software module, an optimal migration time, an optimal migration speed, and an optimal migration cost for managing storage for portions of said data and associated portions of said administrative and operational costs;
executing, by said computing system, a risk modulation software module with respect to said optimal migration time, said optimal migration speed, and said optimal migration cost for said managing;
determining, by said computing system based on results of said executing said modulation software module, a risk associated with said managing;
generating, by said computing system, a report indicating said an optimal migration time, said optimal migration speed, and said optimal migration cost for said managing and said risk;
and transmitting, by said computing system to a user, said report.

10. The computing system of claim 9, wherein said human resource model comprises skill levels associated with administrators associated with executing said process for maintaining said data, expertise levels associated with said administrators, yearly man-hours associated with said administrators, and an hourly rate associated with said administrators.

11. The computing system of claim 9, wherein said plurality of data storage strategies comprise strategies selected from the group consisting of a data management strategy, a data in-house/management strategy, a data management in-house strategy, and a hybrid management strategy.

12. The computing system of claim 9, wherein said method further comprises:
subdividing, by said computing system, each data storage strategy of said plurality of data storage strategies into an active portion, a backup portion, and an archive portion.

13. The computing system of claim 9, wherein said data staging orchestrator software module comprises an optimization phase software module, a planning phase software module, and a risk modulation phase software module.

14. The computing system of claim 13, wherein said method further comprises:
determining, by said optimization phase software module, specified options associated with solutions for said managing;
determining, by said planning phase software module, migration times and migration speeds associated with said specified options; and
determining, by said risk modulation phase software module, a risk-benefit option associated with said migration times, said migration speeds, and said specified options.

15. The computing system of claim 14, wherein said method further comprises:
generating, by said computing system, a report comprising said specified options, said migration times, said migration speeds, and said risk-benefit option.

16. A computer program product, comprising a computer readable storage device storing a computer readable program code, said computer readable program code adapted to implement an optimization method within a computing system comprising a computer-readable memory unit, said method comprising:
receiving, by said computing system, a data footprint associated with data, wherein said data footprint comprises a primary data section, a secondary data section, and an archive data section, wherein said computing system comprises a human resource model comprising administrative and operational costs associated with a process for maintaining said data, and wherein said maintaining said data is performed by an entity;
associating, by said computing system, a plurality of data storage strategies with said primary data section, said secondary data section, and said archive data section;
comparing, by said computing system, each data storage strategy of said plurality of data storage strategies to each other data storage strategy of said plurality of data storage strategies;
executing, by a computer processor of said computing system, a data staging orchestrator software module with respect to said human resource model, said primary data section, said secondary data section, said archive data section, and results of said comparing each said data storage strategy to each said other data storage strategy;
determining, by said computing system based on results of said executing said data staging orchestrator software module, an optimal migration time, an optimal migration speed, and an optimal migration cost for managing storage for portions of said data and associated portions of said administrative and operational costs;

executing, by said computing system, a risk modulation software module with respect to said optimal migration time, said optimal migration speed, and said optimal migration cost for said managing;

determining, by said computing system based on results of said executing said modulation software module, a risk associated with said managing;

generating, by said computing system, a report indicating said an optimal migration time, said optimal migration speed, and said optimal migration cost for said managing and said risk; and transmitting, by said computing system to a user, said report.

17. The computer program product of claim 16, wherein said method further comprises:

subdividing, by said computing system, each data storage strategy of said plurality of data storage strategies into an active portion, a backup portion, and an archive portion.

18. The computer program product of claim 16, wherein said data staging orchestrator software module comprises an optimization phase software module, a planning phase software module, and a risk modulation phase software module.

19. The computer program product of claim 16, wherein said method further comprises:

determining, by said optimization phase software module, specified options associated with solutions for said managing;

determining, by said planning phase software module, migration times and migration speeds associated with said specified options; and determining, by said risk modulation phase software module, a risk-benefit option associated with said migration times, said migration speeds, and said specified options.

20. The computer program product of claim 19, wherein said method further comprises:

generating, by said computing system, a report comprising said specified options, said migration times, said migration speeds, and said risk-benefit option.

* * * * *